(12) United States Patent
Miyachi

(10) Patent No.: US 6,833,097 B2
(45) Date of Patent: Dec. 21, 2004

(54) BIODEGRADABLE BLOCK FOR MODELS

(75) Inventor: Nubuo Miyachi, Aichi (JP)

(73) Assignee: Japan Corn Starch Co. Ltd. (JP)

( * ) Notice: Subject to any disclaimer, the term of this patent is extended or adjusted under 35 U.S.C. 154(b) by 352 days.

(21) Appl. No.: 10/040,217

(22) Filed: Oct. 29, 2001

(65) Prior Publication Data

US 2002/0089091 A1 Jul. 11, 2002

Related U.S. Application Data

(62) Division of application No. 09/476,956, filed on Jan. 3, 2000, now abandoned.

(51) Int. Cl.$^7$ .......................... B29C 43/02; B29C 69/00
(52) U.S. Cl. ........................ 264/118; 264/163; 264/320; 264/330
(58) Field of Search ................................ 264/118, 122, 264/163, 319, 320, 330

(56) References Cited

U.S. PATENT DOCUMENTS

| | | | |
|---|---|---|---|
| 5,201,355 A | * | 4/1993 | Nien .......................... 160/236 |
| 5,656,682 A | | 8/1997 | Rimsa et al. .................. 524/37 |
| 5,693,786 A | | 12/1997 | Tanaka et al. ............... 536/107 |
| 5,714,540 A | | 2/1998 | Tanaka et al. ............ 525/54.24 |
| 5,714,601 A | | 2/1998 | Tanaka et al. ............... 536/107 |
| 5,728,824 A | | 3/1998 | Narayan et al. ............. 536/107 |
| 5,869,647 A | | 2/1999 | Narayan et al. ............. 536/107 |

FOREIGN PATENT DOCUMENTS

| | | |
|---|---|---|
| EP | 0814092 | 12/1997 |
| WO | 9504083 | 9/1995 |
| WO | 9616116 | 5/1996 |
| WO | 9703121 | 1/1997 |

\* cited by examiner

*Primary Examiner*—Mary Lynn Theisen
(74) *Attorney, Agent, or Firm*—Jenner & Block LLP

(57) ABSTRACT

Disclosed is a novel biodegradable block for models, which has excellent workability and machinability and has mechanical properties suitable for models, while surely ensuring its biodegradability. The block is made of a biodegradable plastic material comprising a biodegradable polymer as the base polymer. The biodegradable polymer is a mixture comprising an esterified starch having a degree of substitution (DS) of about 0.4 or more and an esterified cellulose having a DS of about 0.4 or more, in ratio by weight, the former/the latter, of being from 10/0 to 1/9. The plastic material may further contain any of ester plasticizer and organic or inorganic fillers to make the block have desired physical properties.

18 Claims, No Drawings

BIODEGRADABLE BLOCK FOR MODELS

This application is a divisional of and claims priority from U.S. Patent Application No. 09/476,956 filed Jan. 3, 2000.

TECHNICAL FIELD

The present invention relates to novel biodegradable blocks for models, which are made of a biodegradable plastic material comprising a biodegradable base polymer, especially that consisting of a starch ester or a mixture of a starch ester and a cellulose ester.

The term model referred to herein means a so-called patterning model to be used for producing final products, which includes, for example, prototypes, master models, styling models, design models, foundry patterns, crafting models, copying models, and models for confirming tapes in NC machining systems.

The degree of substitution (DS) referred to herein indicates a degree of esterification of polymer ester, which is represented by an average value (at most DS of being up to 3) of substituted hydroxyl groups per one glucose residue in a polymer ester. This DS value is determined by the method referred to the paper as follows; R. L. Whistler, ed., "Method in Carbohydrate Chemistry", Vol. III-Cellulose, Academic Press, Inc., New York, p. 201–203, (1964)

BACKGROUND

Recently, models such as those mentioned above are being made of plastic block, in place of conventional wood and the like, since plastic blocks do not require any care for grain orientation, hygroscopicity and other matters. To produce such models, in general, plastic blocks are cut or machined with hand tools, such as chisels, planes, saws, files and rasps, or with machine tools such as NC machines and lathes.

For their necessary characteristics, plastic blocks for such models are required to have good workability and machinability and also predetermined mechanical properties (e.g., dimension stability, heat resistance, strength). It has heretofore been said that nothing but thermosetting plastics could satisfy such characteristics with ease, for example, used are unsaturated polyester resins, phenolic resins, epoxy resins and polyurethane resins.

On the other hand, recently, there is increasing a demand for biodegradable plastic, especially for those of industrial waste, which can be recycled or which do not pollute the environment when discarded, from the viewpoint of saving natural resources and of environmental protection.

In general, thermosetting plastics to be used for the models, being different from thermoplastic plastics, are not plasticized even under heat but could be only decomposed under heat, and it is difficult to recover and recycle them.

Therefore, at present, the models made of such thermosetting plastics are, after having been used to be useless, discarded as industrial wastes, thus ending up in incinerators or landfills.

However, where these are incinerated, they give high combustion heat to damage incinerators and, in addition, often generate much soot and smoke, as being made of thermosetting plastics. If, on the other hand, these are desired to be in landfills, the spaces for landfills are insufficient and, in addition, they do not decompose almost semi-permanently to eventually have some negative influences on soil organisms, etc.

Given the situation, biodegradable plastics are now desired which are free from the problems with plastics, especially thermoplastic plastics to be discarded. Biodegradable plastics can be composted in kitchen garbage processors or composters. In addition, even when discarded in landfills, they are decomposed in soil without having almost no negative influence on soil organisms and others in landfills.

Biodegradable plastics that are at present commercially available include, for example, polyesters to be produced by microorganisms (e.g., polyhydroxybutyrate valerate), and synthetic plastics, such as linear aliphatic polyesters, polycaprolactones, polylactic acids and starch-polyvinyl alcohol alloys.

However, it is said that many such commercially-available biodegradable plastics are unfavorable for use in blocks for models because of their poor physical properties. Specifically, their workability or machinability with hand tools or machine tools is poor. In other words, such biodegradable plastics are too much adhesive to cutting tools and are difficult to cut and work with hand tools; and, if they are machined with machine tools, their cut surfaces are partly melted, and it is difficult to obtain products with well cut surfaces (well finished surfaces).

For these reasons, the development of biodegradable plastics with both good workability and machinability and good mechanical and physical properties that are suitable for use in blocks for models, while naturally having good biodegradability, has been desired in the art.

SUMMARY OF THE INVENTION

In view of the above, the object of the patent invention is to provide novel biodegradable blocks for models, which have good workability and machinability and which have good mechanical characteristics suitable for models, while naturally having good-biodegradability.

(1) We, the present inventors have assiduously studied in order to attain the above-mentioned object, and have found that shaped products of esterified starches can be easily cut with hand tools such as knives. On the basis of this finding, we have further studied and, as a result, have further found that a biodegradable thermoplastic composition comprising an esterified starch having a particular degree of substitution with particular substituents or a mixture of such an esterified starch and an esterified cellulose having a particular degree of substitution with particular substituents has good workability and machinability and good mechanical properties (especially, good dimension stability, high heat resistance) suitable for use in blocks for models, resulting in the finding of biodegradable blocks for models, which comprise the component mentioned below.

Specifically, the present invention provides a biodegradable block for models which is made of a biodegradable plastic material comprising, as the base polymer, a biodegradable polymer, and which is characterized in that:

said biodegradable polymer is a mixture comprising (a) an esterified starch having a DS of about 0.4 or more and (b) an esterified cellulose having a DS of about 0.4 or more, in a ratio by weight, (a)/(b), of being from 10/0 to 1/9.

Wherein said esterified starch basically contains one or more members selected from the group as follows:

(1) An vinyl esterified starch prepared by esterifying a starch with an esterifying reagent of a vinyl ester in a non-aqueous organic solvent in the presence of an esterification catalyst.

(2) An esterified, polyester-grafted starch which is formed by esterifying starch and grafting starch with polyester.

(3) A mixed esterified starch of which hydrogen in the reactive hydroxyl group of the same starch molecule is substituted with an acyl group that has 2 to 4 carbon atoms (short chain acyl group) and an acyl group that has 6 to 18 carbon atoms (long chain acyl group).

In addition, wherein said esterified starch contains a starch ester having a DS of about 1.0 to 2.8, which is produced by a process wherein a purified starch containing at least 50% of amylose is reacted with an acylation reagent in the presence of a basic catalyst in an anhydrous aprotic solvent.

Esterified starch have been reported in literature, but as far as we, the present inventors know, there is no report referring to the use of esterified starches as thermoplastics to give commercial product.

On the other hand, of esterified cellulose, cellulose acetate and cellulose acetate propionate are much used as plastic materials for producing shaped articles and films.

We have already proposed that esterified starches and mixtures of esterified starches and esterified cellulose are both usable as biodegradable plastic materials, in our own prior patent applications (see Japanese PCT Patent Application Laid-Open No. 8-507101, Japanese Patent Application Laid-Open Nos. 8-188601 and 8-143710, and Japanese Patent No. 2742892).

However, in the above-mentioned patent applications, we expected the use of the materials for shaped articles, such as containers, dishes, cups, knives, forks and spoons, and the use thereof in horticultural and agricultural use, for example, as films, sheets, laminates and foams. In these, we did not expected them to be applicable to blocks for models that require the workability, machinability and dimension stability such as those mentioned hereinabove.

(2) In preferred embodiments of the present invention, the esterified starch has a DS of from about 1.0 to about 2.8, the esterified starch is prepared from a high-amylose starch having an amylose content of about 50% or higher, and it has ester groups with from 2 to 18 carbon atoms.

In more preferred embodiment, the esterified starch is starch acetate, starch propionate, starch acetate propionate, or a mixture of these.

A plasticizer may be added to the biodegradable polymer for the purpose to improve the shapability, workability and machinability of the block. Preferably, an ester plasticizer miscible with the esterified starch and the esterified cellulose may be added thereto in an amount of up to 35% by weight.

In order to further improve the mechanical properties of the block, an inorganic or organic reinforcing filler may be added to the biodegradable plastic material in an amount of up to about 50% by weight.

The biodegradable block for models of the present invention can be produced by kneading the biodegradable polymer optionally along with such an plasticizer and a reinforcing filler, forming it into biodegradable plastic pellets or others, putting them into a mold, melting them under heat therein, and shaping the resulting melt into a block through press shaping or the like.

To produce biodegradable blocks from the block of the invention, the block may be cut or machined with hand tools or machine tools.

The biodegradable block for models of the present invention, as having the constitution mentioned hereinabove, has good workability and machinability and also have necessary mechanical properties (especially, good dimension stability and high heat resistance). as will be demonstrated in the example to be mentioned hereinunder.

The results of the present invention that produces the biodegradable block for models having good workability and machinability and even good mechanical properties are surprising, as will be demonstrated in the cutting and machining tests mentioned hereinunder, in which samples of the biodegradable block of the invention were compared with samples of conventional biodegradable plastics such as those mentioned hereinabove, resulting in that the workability and the machinability and even the mechanical properties of the conventional biodegradable plastic samples were inferior to those of thermosetting plastic samples.

DETAILED DESCRIPTION

Now, the present invention that has achieved the above-mentioned object will be described in detail hereinunder.

A. The block for models of the present invention is characterized in that it is made of a biodegradable plastic material comprising, as the constitutive requirement in the highest conception, a base polymer of a biodegradable polymer and that said biodegradable polymer comprises an esterified starch having a predetermined degree of substitution or a mixture of said esterified starch and an esterified cellulose having a predetermined degree of substitution.

(1) The esterified starch to be used herein is one having a middle degree or high degree of substitution, or that is, one having a DS of about 0.4 or more, preferably from about 1.0 to about 2.8, more preferably from about 1.5 to about 2.5.

If an esterified starch having a DS of less than about 0.4 is used, it is impossible to obtain blocks with good water proofness, and is also impossible to obtain blocks with good mechanical properties, or that is, those having the necessary dimension stability, mechanical strength and heat resistance, and in addition, the blocks comprising such an esterified starch do not have good workability and machinability. On the other hand, if an esterified starch having a DS of more than about 2.8 is used, the biodegradability of the blocks obtained is poor although their mechanical properties such as those mentioned above may be good.

Preferably used herein are mono-esterified or mixed-esterified starches of which the ester group has generally from 2 to 18 carbon atoms, desirably from 2 to 6 carbon atoms, and which may be prepared by mono-esterifying or mixed-esterifying starches with one or more organic acids, such as carboxylic acids mentioned below (the parenthesized number indicates the number of carbon atoms constituting the acid). The mixed-esterified starches as referred to herein include those each having two or more different ester substituents in one molecule.

(a) Saturated fatty acids: Acetic acid (C2), propionic acid (C3), butyric acid (C4), caproic acid (C6), caprylic acid (C8), lauric acid (C12), palmitic acid (C16), stearic acid (C18), etc.

(b) Unsaturated fatty acids: Acrylic acid (C3), crotonic acid (C4), isocrotonic acid (C4), oleic acid (C18)

(c) Aliphatic saturated or unsaturated dicarboxylic acid: Malonic acid (C3), succinic acid (C4), adipic acid (C6), maleic acid (C4), fumalic acid (C4), etc.

(d) Aromatic carboxylic acid: Benzoic acid, phthalic acid, etc.

In particular, especially preferred are starch acetate, starch propionate, and a mixed-esterified starch of starch acetate propionate, which may be used singly or as combined, as producing with ease blocks (and also models) having good mechanical strength and heat resistance.

The esterified starches for use in the present invention can be produced by any known methods using any of carboxylic acid anhydrides or chlorides, or even any other esterifying reagents. However, it is desirable to use the methods disclosed in the applicant's own prior patent publications such as those mentioned below, as producing with ease the intended biodegradable blocks with good mechanical strength and heat resistance.

(a) A method of using water-free reaction, such as that disclosed in Japanese PCT Patent Application Laid-Open No. 8-507101 (see its claim 27, etc.).

"A starch is mixed and reacted with an esterifying reagent in a water-free aprotic solvent in a modification step to give a hydrophobic, biodegradable starch ester product of which the ester group has up to 18 carbon atoms."

Especially, preferable one is a starch ester having a DS of about 1.0 to 2.8, which is produced by a process wherein a purified starch containing at least 50% of amylose is reacted with an acylation reagent in the presence of a basic catalyst in an anhydrous aprotic solvent.

(b) A method of using a vinyl ester of a carboxylic acid, such as that disclosed in Japanese Patent Application Laid-Open No. 8-188601.

"A method of producing a starch ester using a vinyl ester as an esterifying reagent, which is characterized in that:

a starch is reacted with said vinyl ester, of which the ester group has from 2 to 18 carbon atoms, in a non-aqueous organic solvent in the presence of an esterification catalyst."

(c) An esterified, polyester-grafted starch which is formed by esterifying starch and grafting starch with polyester, such as that disclosed in Japanese Patent No. 2742892.

"An esterified, polyester-grafted starch which is formed by esterifying starch and grafting starch with polyester, characterized in that the esterification involves one or more saturated or unsaturated aliphatic acids or aromatic carboxylic acids having 2 to 18 carbon atoms and the polyester is one which is formed from one or more 4- to 12-membered lactones by ring-opening polymerization, with the terminal hydroxyl groups being almost completely blocked by esterification."

(d) Short/long chain acyl group substituted esterified starch, such as that disclosed in Japanese Patent No. 2939586.

"A mixed esterified starch of which hydrogen in the reactive hydroxyl group of the same starch molecule is substituted with an acyl group that has from 2 to 4 carbon atoms (short chain acyl group) and an acyl group that has from 6 to 18 carbon atoms (long chain acyl group), and the ratio of said short chain acyl group and long chain acyl group is adjusted so that said esterified starch is possible to be thermoplastic without a plasticizer and to form molds and films."

The starting starch to be esterified may include raw starches to be derived from corn, potato, sweet potato, wheat, sago, cassava, tapioca, rice, bean, arrowroot, bracken, or lotus, and also physically-modified starches to be prepared by pregelatinizing said raw starches, enzyme-modified starches to be prepared by decomposing them with enzymes, as well as chemically-modified starches to be prepared by processing them with acids or hypochlorous acid or by ionizing or hydroxylating (or etherifying) them.

Of these, preferred are high-amylose starches having an amylose content of 50% by weight or more, as producing with ease block with good mechanical properties (high dimension stability, good heat resistance, high strength) with good workability and machinability.

(2) The esterified cellulose to be used herein is like the esterified starch mentioned hereinabove, one having a middle degree or high degree of substitution, or that is, one having a DS of about 0.4 or more, preferably from about 1.0 to about 2.8, more preferably from about 1.5 to about 2.5. If an esterified cellulose having a DS of less than about 0.4 is used, it is impossible to obtain blocks with good water proofness, and it is also impossible to obtain blocks with good mechanical properties (e.g., high dimension stability, good heat resistance, high strength). On the other hand, if an esterified cellulose having a DS of more than about 2.8 is used, the biodegradability of the blocks obtained is poor although their mechanical properties such as those mentioned above may be good.

As in the esterified starch mentioned hereinabove, the ester group of the esterified cellulose may have from 2 to 18 carbon atoms. Of such esterified cellulose, preferred are cellulose esters with lower fatty acids, such as cellulose acetate and cellulose propionate, which may be used singly or as combined, as producing with ease blocks (and also models) having the necessary mechanical properties.

The mixing ratio of the esterified starch to the esterified cellulose to give the intended biodegradable polymer for use in the present invention shall fall between 10/0 and 1/9, preferably between 10/0 and 4/6, by weight.

If the proportion of the esterified starch is too small, it is impossible to obtain block with good workability and machinability. The higher the proportion of the esterified cellulose, the better the mechanical characteristics of the blocks obtained.

A part of the esterified starch or the esterified cellulose may be substituted with any of other biodegradable polymers, such as polycaprolactones, polylactic acids, polyadipates, polyhydroxybutyrates and polyhydroxybutyrate valerates, only within the range not having any negative influence on the workability and machinability of the resulting blocks. Although, favorably, other biodegradable polymers is not exceed than 70% as weight in the base polymer, because excess amount of other biodegradable polymers will be cause of poor workability and machinability.

(3) The biodegradable plastic material of the present invention may contain an ester plasticizer.

The functional groups in ester plasticizers are common to esterified starches and celluloses, and therefore ester plasticizers are well miscible with esterified starches and celluloses. Accordingly, if added to the plastic material of the invention, the ester plasticizer improves the flowability (shapability) of the plastic material to be formed into blocks for models without worsening the mechanical properties of the blocks formed.

The amount of the plasticizer to be added depend on the ester substituents in the esterified starch and optionally the esterified cellulose constituting the plastic material and even on the degree of substitution of such esterified starch and cellulose. It is desirable to add a larger amount of such a plasticizer to esterified starch and cellulose of which the ester group has smaller carbon atoms and which have a lower degree of substitution. The suitable amount of the plasticizer to be added shall be determined in consideration of the glass transition temperature (Tg) of the esterified starch and optionally the esterified cellulose constituting the plastic material.

Desirably, the amount of the plasticizer to be added is controlled to be about 35% by weight or less, preferably about 30% by weight or less, thereby making the plastic material comprising the plasticizer have a Tg of from about 65 to about 120° C. If the amount of the plasticizer added is more than about 35% by weight, it is difficult to make the resulting plastic material have a Tg falling within the above-mentioned range and, in addition, the plasticizer added will often bleed out of the blocks formed, whereby the dimension stability and the heat resistance of the blocks are often worsened.

Preferred examples of ester plasticizers usable in the present invention are mentioned below.

(a) Phthalates: Methyl, diethyl, dipropyl, dibutyl, dihexyl, diheptyl and dioctyl phthalates, and ethylpthalylethyl glycolate, butylphthalylbutyl glycolate, etc.

(b) Esters of aliphatic dibasic acids: Diethyl, dibutyl and dioctyl adipates, succinates, azelates, sebacates, etc.;

(c) Fatty acid ester derivatives: Methyl, ethyl, butyl and propyl oleates, stearates, erucates, licinolates, lactates, citrates, etc.

(d) Esters of polyalcohols: Glycerol triacetate (triacetin), glycerol mono- and di-acetates, glycerol mono-, di- and tri-propionates, glycerol tributanoate (tributyrin), glycerol mono- and di-butanoates, glycerol mono-, di- and tri-stearates, etc.

(e) Esters of hydroxyacids: Methyl acetyllicinolate, triethyl acetylcitrate, etc.

(f) Phosphates: Tributyl phosphate, triphenyl phosphate, etc.

Of these, preferred are esters of polyalcohols, such as triacetin and tributyrin, as being highly miscible with esterified starches and esterified cellulose.

(4) The biodegradable plastic material of the present invention may further contain any one or more of biodegradable organic fillers having no negative influence on the workability and machinability of blocks, such as those mentioned below, and inorganic fillers having no negative influence on the workability and machinability of blocks and even on soil organisms, such as those mentioned below, in an amount of about 50% by weight or less, desirably about 30% by weight or less, by which the intended mechanical strength, heat resistance and dimension stability (anti-shrinking property) of the blocks to be formed can be controlled. If, however the filler content is more than 35% by weight, it will often have some negative influences on the workability and machinability of the blocks formed.

(a) Organic fillers: Starch, cellulose fiber, cellulose powder, wood powder, wood fiber, pulp, pecan fiber, cotton linters, lignin, grain husks, cotton powder, etc.

(b) Inorganic fillers: Talc, calcium carbonate, titanium oxide, aluminium oxide, clay, sand, diatomaceous earth, silicates, mica, glass (beads, flakes, fiber), quartz powder (flint), etc.

Of these, preferred are cellulosic fiber-type fillers, as effectively improving the mechanical strength of the block formed without having any negative influence on the workability and machinability thereof. More preferred is cellulosic microfiber as characterized by the following factors, in view of the impact strength of the blocks formed. Concretely employable is a commercially-available product, "SOLKA-FLOC" (sold by Hayashi Chemical Co.).

Mean length (L): 20 to 750 μm (desirably, 30 to 600 μm)
Mean diameter (D): 5 to 80 μm (desirably, 10 to 70 μm)
L/D: Nearly 3 to 60 (desirably, nearly 5 to 50)

As other cellulosic fibers, also employable herein are typically cotton linters, oat fiber, pecan fiber and other natural fibers, as well as even semi-synthetic fibers such as acetate rayon fiber.

(5) The biodegradable plastic material of the present invention may further contain, in addition to the above-mentioned plasticizer and filler, any other additives, such as colorants, stabilizers, antioxidants, deodorizers, flame retardants, lubricants, mold release agents, etc.

The biodegradable plastic material of the present invention can be easily worked or machined to give shaped articles with good water-proofness and good mechanical properties. Most importantly, the articles made of the material are completely biodegradable, and therefore, after having been used to be useless, these can be composted in a composter such as a kitchen garbage processor.

We, the present inventors have found that, if the biodegradable plastic material of the present invention is desired to be used for forming blocks for models, the esterified starch or mixture of the esterified starch and the esterified cellulose that shall constitute the material must be kneaded optionally along with a plasticizer and/or a filler, and then fully homogenized at temperatures higher than the melting point of the resulting mix, prior to shaping the plastic material into blocks.

The plastic material of the invention is, like conventional thermoplastic resins, powdered or pelletized, using a mixer or pelletizer, to be formed into a shaping material.

From the thus-prepared shaping material, blocks for models can be produced, for example, in the manner mentioned below.

The shaping material is put into a press-shaping mold, and fully heated therein for a sufficient period of time to form a uniform melt. The heating temperature, though depending on the glass transition temperature of the material, may be generally between 110° C. and 210° C.

The resulting melt is compressed using a press, or that is, press-shaped to have a desired dimension, and thereafter cooled to room temperature to give a tabular block. A plurality of these blocks thus formed may be bonded together with a suitable adhesive to give a block mass for models having a desired dimension. The thus-obtained blocks may be cut or machined with hand tools or machine tools, such as NC machines or lathes, into intended models.

As has been described in detail hereinabove, the biodegradable block for models of the present invention comprises a biodegradable polymer mixture that is comprised of an esterified starch having a DS of about 0.4 or more and an esterified cellulose having a DS of about 0.4 or more in a ratio by weight of the former to the latter of being between 10/0 and 1/9. Therefore, as will be demonstrated in the following examples, the block has excellent workability and machinability and also good mechanical properties, such as high dimension stability, good heat resistance and high strength, to such a degree that it is applicable to the formation of models, while surely maintaining its biodegradability.

EXAMPLE

Now, to demonstrate the effect of the present invention, hereinunder mentioned as example of the invention along with comparative examples to these, which, however, are not intended to restrict the scope of the invention.

A. Preparation of Biodegradable Plastic Materials:

(1) Preparation of Esterified Starch:

(a) According to the method described in Japanese PCT Patent Application laid open No. 8-507101, an esterified starch was prepared in the manner mentioned below.

1000 g of high-amylose corn starch (amylose content: 70%) was suspended in 9000 g of dimethylsulfoxide (DMSO), and heated up to 80° C. to give a uniform solution. Next, the mixture was cooled to room temperature, 58 g of dimethylaminopyridine dissolved in 1600 ml of DMSO was added, and 1500 g of sodium bicarbonate was added. Then the mixture was cooled to 40° C. Next, 1700 g of acetic anhydride was added slowly to the mixture and reacted for 2 hours with continuous agitation. The resulting reaction mixture was poured into 10 fold of water, and the precipitate thus formed was collected through centrifugal filtration. The precipitate was suspended in 30 litters of water and washed through dewatering filtration, which was repeated three times. Next, this was put into an oven and dried therein at 55° C. to prepare a powdery acetylated starch, which has DS of nearly 1.9.

(b) According to the method described in Japanese Patent Application laid open No. 8-188601, an esterified starch was prepared in the manner mentioned below.

1000 g of high-amylose corn starch (amylose content: 70%) was suspended in 8000 g of dimethylsulfoxide (DMSO), and heated up to 80° C. to give a uniform solution. Still at 80° C., 100 g of sodium carbonate and 440 g of vinyl laurate were added to this in that order and reacted for 2 hours. The resulting reaction mixture was poured into 30 liters of water, and the precipitate thus formed was collected through centrifugal filtration. The precipitate was suspended in 30 litters of water and washed through dewatering filtration, which was repeated three times. Next, this was put into an oven and dried therein at 60° C. to prepare a powdery acetylated starch, which has DS of nearly 0.75.

(c) An esterified, polyester-grafted starch, such as that disclosed in Japanese Patent No. 27428

1000 g of corn starch was suspended in 8000 g of dimethylsulfoxide (DMSO), and heated up to 80° C. and gelatinized in 20 minutes. Next, 300 g of sodium carbonate, 6685 g of ?-caprolactone and 2208 g of vinyl propionate monomer were added and reacted for 5 hours at 80° C. The resulting reaction mixture was poured into water, and the precipitate thus formed was collected. The precipitate was washed, dewatered and dried to prepare a powdery esterified, polyester-grafted starch, which has DS of nearly 2.6.

(d) Short/long chain acyl group substituted esterified starch, such as that disclosed in Japanese Patent No. 29395

1000 g of corn starch dried less than 1% of moisture was suspended in 8000 g of dimethylsulfoxide (DMSO), and heated up to 90° C. and gelatinized in 20 minutes. Next, 50 g of bromo t-butyl and 5320 g of hexadecylketenedimer (C17) were poured in to the mixture. The vessel was vacuumed and reacted for 5 hours at 90° C. with refluxing DMSO. Next, after breaking the vacuum to the atmosphere pressure, 1260 g of acetic anhydride and 1040 g of sodium bicarbonate were added and reacted for 1 hours at reflux temperature. The byproduct and non-reacted matter was poured out. The resulting reaction mixture was poured into water with vigorous agitation and the precipitate thus formed was collected. The precipitate was suspended in 50 litters of water and washed through dewatering filtration, which was repeated five times. Each degree of substitution of short or long chain acyl group of this starch ester was 1.89 for short chain acyl group (C2) and 0.23 for long chain acyl group (C17), which was analyzed by the saponification method. (Genung & Mallet, 1941, Smith, 1967)

(2) Preparation of Biodegradable Plastic Materials:

Example 1

630 g of each esterified starch prepared in the above and the 1:1 mixture of (a) and (d), and 300 g of cellulosic fiber "SOLKA-FLOC" (sold by Hayashi Chemical Co.) were put into a Henshel mixer. While starring these in the mixer, 70 g of triacetin was added thereto little by little to give a uniform powder. Each powder was pelletized through a double-screw extruder having screws with diameter of 2.6 cm (L/D=25) and equipped with three dies, under the temperature condition mentioned below, to prepare a plastic material.

| Temperature Condition: | |
| --- | --- |
| Zone 1 (supply zone): | 80° C. |
| Zone 2: | 130° C. |
| Zone 3: | 190° C. |
| Zone 4: | 190° C. |
| Zone 5 (die zone): | 170° C. |

Example 2

Another plastic material was prepared through pelletization in the same manner as in Example 1, except that 300 g of talc was used in place of 300 g of cellulosic fiber.

Example 3

320 g of each esterified starch prepared in the above, and 480 g of powder of an esterified cellulose "Acetate Flakes" (cellulose acetate having a DS of 2.5, produced by Teijin Ltd.) were put into a Henshel mixer. While stirring these in the mixer, 200 g of triacetin was added thereto little by little to give a uniform powder. The powder was pelletized through the same double-screw extruder under the same condition as in Example 1 to prepare a plastic material.

Comparative Example 1

Herein used was a polylactic acid, "Lacty" (trade name of the product of Shimadzu Corporation).

Comparative Example 2

Herein used was a polybutylen succinate, "Bionolle #3010" (trade name of the product of Showa Highpolymer Co.).

Comparative Example 3

Herein used was a polycaprolactone, "TONE 787" (trade name of the product of Union Carbide Chemicals and Plastics Company, Inc.)

Comparative Example 4

Herein used was a polyhydroxy butyrate valerate, "Biopol" (trade name of the product of Zeneca Inc.).

Comparative Example 5

Herein used was a starch-polyvinyl alcohol alloy, "Mater-Bi AF10H" (trade name of the product of Novamont Co.).

B. Preparation of Blocks for Models:

Each of the plastic material samples of Examples 1 to 3 and Comparative Examples 1 to 5 mentioned above was put into the mold of a pressing machine, "Heat Press" (trade name of the machine of Tester Industrial Co.), then melted therein under heat in different conditions as mentioned below, and shaped under pressure (200 kgf/cm$^2$×5 min). Thus were obtained various block samples for cutting and machining tests. The comparative samples were only for cutting tests with hand tools.

Heating Conditions:

Examples 1 to 3: 180° C.×5 min.

Comparative Example 1: 190° C.×5 min.

Comparative Example 2: 170° C.×5 min.

Comparative Example 3: 150° C.×5 min.

Comparative Example 4: 180° C.×5 min.

Comparative Example 5: 180° C.×5 min.

Sizes of Block Samples:

(1) For cutting test with hand tools: 10×10×2 cm (2) For machining test with end mill: 10×10×6 cm (3) For machining test with band saw: 40×30×15 cm C. Evaluation of Workability and Machinability of Block Samples:

(1) Evaluation of Workability with Hand Tools:

Using hand tools such as knives and chisels, the block samples were cut. The samples of Examples 1 to 3 of the invention were well cut, and their workability was good. The pieces cut out of these had sharp edges and smooth faces, while having vivid outward appearance. As opposed to these, the samples of Comparative Examples 1 to 5 could not cut well, and their workability was bad. In addition, the sample of Comparative Example 1 (polylactic acid) and that of Comparative Example 3 (polycaprolactone) were problematic in the heat resistance; and the sample of Comparative Example 4 (starch-polyvinyl alcohol alloy) was problematic in the dimension stability as being hygroscopic.

(2) Evaluation of Machinability with End Mill:

Using an end mill (20 mm φ) NC machine, each block sample was holed, at an end mill rotation of 600 rpm, to have a hole having a diameter of 5 cm and a depth of 3 cm. All samples of Examples 1 to 3 of the invention tested herein had sharp holes with no broken edge, and the inner walls of the holes formed were all finished to be smooth. No dust adhered to the end mill used, and little powder scattered during the machining.

(3) Evaluation of Machinability with Band Saw:

Using a band saw, each block sample was cut into pieces of 10×10×5 cm, at a sawing speed of 4 m/sec. All samples of Examples 1 to 3 of the invention tested herein were cut into sharp pieces with no broken edge, and their cut faces were smooth and good.

D. Mechanical Properties of Biodegradable Plastic Materials:

The biodegradable plastic samples as prepared in Example 1 to 3 were tested to determine the tensile strength and the tensile modulus thereof in accordance with ASTM D638, to determine the flexural strength and the flexural modulus thereof in accordance with ASTM D790, and to determine the glass transition temperature thereof in accordance with JIS K7121.

The data obtained are shown in Table 1 below, from which it is known that these samples tested herein both have satisfactory mechanical strength well applicable to the production of models.

TABLE 1

| Examples | Example 1 | | | | | Example 2 | Example 3 |
|---|---|---|---|---|---|---|---|
| Esterified starch | (a) | (b) | (c) | (d) | (a) + (d) | (a) | (a) |
| Tensile Strength (kgf/cm$^2$) | 410 | 380 | 350 | 340 | 360 | 310 | 420 |
| Tensile Modulus (kgf/cm$^2$) | 45,200 | 35,000 | 18,000 | 30,000 | 38,000 | 56,400 | 44,500 |
| Flexural Strength (kgf/cm$^2$) | 860 | 650 | 570 | 600 | 750 | 700 | 850 |
| Flexural Modulus (kgf/cm$^2$) | 54,400 | 38,000 | 24,500 | 35,000 | 41,000 | 68,700 | 53,700 |
| Glass Transition Temperature Tg ?° C.? | 97 | 105 | 123 | 100 | 95 | 101 | 96 |
| Biodegradability Decreased Weight (%) | 87 | Vanished (100) | 44 | 36 | 70 | 24 | 27 |

E. Biodegradability of Biodegradable Plastic Materials:

Each of the blocks for models for cutting test with hand tools (10×10×2 cm) of Examples 1 to 3 were laid underground in the depth of 5 cm of the soil for plant at the open-air field in Hekinan city, Aichi, Japan. Then after 6 months, test blocks were dug up and washed, dried, moistured and weighed. The biodegradability was calculated by the % of reduced weight compared with the before. The data obtained are shown in Table 1. As a reference, polyester resin was used as a substitute for esterified starch resin, and the blocks for models were prepared as the same manner for Examples 1 and 2 and were tested the biodegradability. Each of reduced weight was 7% and 0.4% respectively.

What is claimed is:

1. A method for producing a biodegradable model, comprising the steps of:

forming a biodegradable plastic material comprising a biodegradable polymer into a desired form, said biodegradable polymer comprising (a) an esterified starch having a degree of substitution (DS) of about 0.4 or more and (b) an esterified cellulose having a DS of about 0.4 or more, in a ratio by weight (a)/(b), of from 10/0 to 1/9;

placing said biodegradable plastic material into a mold;

melting said biodegradable plastic material in said mold using heat; and shaping into a block said biodegradable plastic material in said mold under compression; and cutting or machining said block with hand tools or machine tools.

2. The method of claim 1 wherein said desired form comprises pellets.

3. The method of claim 1 wherein said desired form comprises powder.

4. The method of claim 1 further comprising the step of kneading said biodegradable polymer with at least one of an ester plasticizer in an amount of about 35% by weight or less and a filler in an amount of about 50% by weight or less.

5. The method of claim 4 wherein said filler comprises an organic material.

6. The method of claim 4 wherein said filler comprises an inorganic material.

7. The method of claim 1 wherein said esterified starch comprises at least one of the following:

(1) an esterified starch prepared by esterifying a starch with an esterifying reagent of a vinyl ester in a non-aqueous organic solvent in the presence of an esterification catalyst;

(2) an esterified, polyester-grafted starch which is formed by esterifying starch and grafting starch with polyester; and (3) a mixed esterified starch of which hydrogen in the reactive hydroxyl group of the same starch molecule is substituted with an acyl group that has from 2 to 4 carbon atoms and an acyl group that has from 6 to 18 carbon atoms.

8. The method of claim 1, wherein said esterified starch contains a starch ester having a DS of about 1.0 to 2.8, which is produced by a process wherein a purified starch containing at least 50% of amylose is reacted with an acylation reagent in the presence of a basic catalyst in an anhydrous aprotic solvent.

9. The method of claim 1, wherein said esterified starch is one as prepared from a high-amylose starch having an amylose content of about 50% by weight or higher.

10. The method of claim 1, wherein said esterified starch has a DS of about 1.0 to 2.8.

11. The method of claim 1, wherein said biodegradable plastic material comprises a mixture of said biodegradable polymer and biodegradable polyester.

12. The method of claim 1, wherein said biodegradable plastic material contains, as a side component, an ester plasticizer in an amount of about 35% by weight or smaller, to have a glass transition temperature falling between about 65° C. and about 120° C.

13. The method claim 1, wherein said biodegradable plastic material contains an organic or inorganic filler in an amount of about 50% by weight or smaller to have predetermined dimension stability, heat resistance and strength.

14. The method of claim 13, wherein said organic filler is cellulosic fiber.

15. The method of claim 14, wherein said cellulosic fiber is cellulosic microfiber having a mean length (L) of from about 20 to about 750 $\mu$m, and a mean diameter (D) of from about 5 to about 80 $\mu$m, wherein the ratio L/D is in the range of about 3 to about 60.

16. The method of claim 13 wherein said step of cutting or machining comprises machining using a numerically controlled machine or a lathe.

17. The method of claim 1 wherein said model comprises a patterning model for use in producing a final product comprising a prototype, a master model, a styling model, a design model, a foundry pattern, a crafting model, a copying model or a model for confirming a tape for a numerically controlled machine or a lathe.

18. The method of claim 1 wherein said model comprises a patterning model for use in producing a final product in the group consisting of a prototype, a master model, a styling model, a design model, a foundry pattern, a crafting model, a copying model and a model for confirming a tape for a numerically controlled machine or a lathe.

* * * * *

UNITED STATES PATENT AND TRADEMARK OFFICE
CERTIFICATE OF CORRECTION

PATENT NO.     : 6,833,097 B2
DATED          : December 21, 2004
INVENTOR(S)    : Miyachi It is certified that error appears in the above-identified patent and that said Letters Patent is hereby corrected as shown below:

Column 9,
Line 38, delete "Japanese Patent No. 27428" and insert -- Japanese Patent No. 2742892. --
Line 50, delete "Japanese Patent No. 29395" and insert -- Japanese Patent No. 2939586. --

Column 12,
Line 62, delete "using heat; and" and insert -- using heat; --

Signed and Sealed this

Third Day of May, 2005

JON W. DUDAS
*Director of the United States Patent and Trademark Office*